United States Patent Office 2,864,074
Patented Dec. 9, 1958

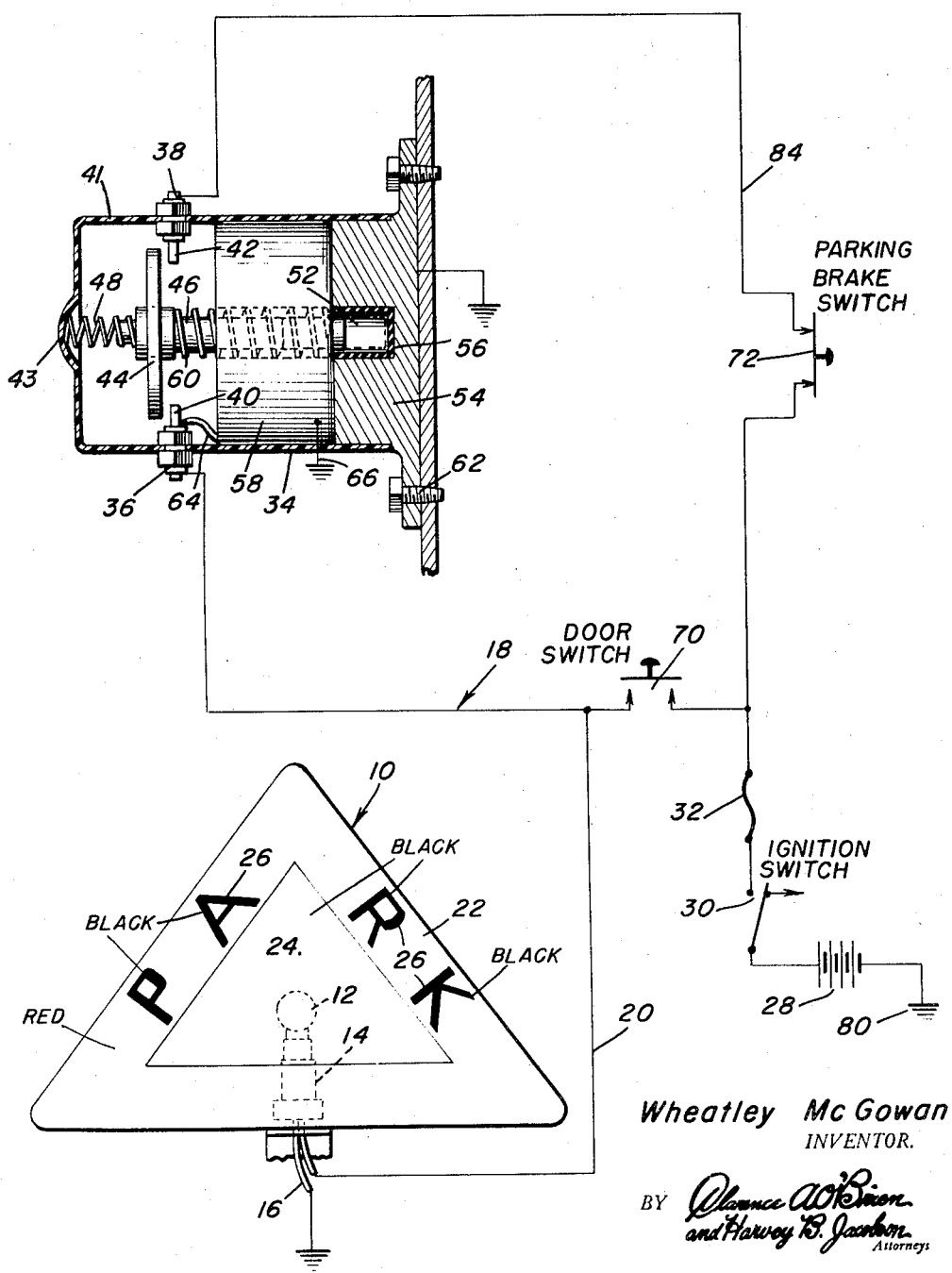

2,864,074

AUTOMOBILE PARKING INDICATOR

Wheatley McGowan, Joliet, Ill.

Application September 14, 1956, Serial No. 609,843

2 Claims. (Cl. 340—74)

This invention relates to an attachment for an automotive vehicle such as an automobile, truck, or the like and more particularly to a device to indicate to a motorist following another vehicle of the intention of the operator of the preceding vehicle to park the vehicle.

The present invention is adapted to be operated by a motorist as soon as the motorist notices a parking place or just prior to reaching the desired packing spot. By providing an indication that he intends to park his vehicle the motorist will provide traffic following behind the vehicle a chance to stop far enough behind to allow the vehicle to be parked or to allow following vehicles to move to another lane thus reducing congestion of traffic and tending to reduce accidents.

The construction of this invention features the use of a novel parking indicator which is adapted to be attached in any suitable spot preferably on the rear of an automotive vehicle and which employs a relay for holding a circuit between the battery of the vehicle and the parking signal lamp until another of a series of switches such as the switches controlled by the doors, and the ignition switch whereby upon opening of any of these other switches the circuit to the lamp will be opened.

Still further objects and features of this invention reside in the provision of an automobile parking indicator that is simple in construction, easy to install, and which is relatively inexpensive to manufacture thereby permitting wide use and distribution in the automotive field.

These, together with the various ancillary objects and features of the invention which will become apparent as the following description proceeds, are attained by this automobile parking indicator, a preferred embodiment of which has been illustrated in the accompanying drawings by way of example only, wherein the figure is a schematic wiring diagram of the various elements of the invention and illustrating in section the construction of the relay utilized in the invention.

With continuing reference to the accompanying drawing, reference numeral 10 generally designates the indicator lamp which is adapted to be mounted on the rear or other suitable portion of an automotive vehicle such as a passenger car, truck, bus or the like so as to provide a warning to a motorist following therebehind that it is the intention of the operator of the vehicle to park. This indicator lamp may be constructed in any suitable manner and includes a lamp bulb 12 mounted in a socket 14 in any convenient manner to which conductors are attached, the lamp bulb 12 being connected to ground through conductor 16 and to a control circuit as indicated at 18 through conductor 20.

It is preferable that the indicator lamp 10 be standardized and a suggested arrangement of parts is to provide a red triangular shaped lens as indicated at 22 with a blacked out center triangle 24 and with preferably black letters as indicated at 26. Thus, the black letters 26 will stand out vividly against the red illuminated background formed by the triangular lens 22.

In order to control the lamp 12 there is provided means for connecting the lamp bulb 12 to the battery 28 of the vehicle which forms a source of electrical energy thereof. This means includes the control circuit 18 and, if desired, various other switches.

The ignition switch 30 controls the operative electrical circuit from the battery 28 to the control circuit and a fuse 32 is provided. There is provided a relay 34 which is the control device utilized in the invention for maintaining an operative electrical circuit from the battery 28 to the lamp 12. This relay 34 includes a pair of contact terminals 36 and 38 which are secured to a housing 40 having a manually depressible portion 43. The contact terminals 36 and 38 include contacts 40 and 42 which are spaced and insulated from each other and which are adapted to be bridged by a contact plate 44 mounted on an armature 46. A spring 48 normally separates the armature 46 and the depressible portion 43 of the housing 41.

The armature 46 is extendable into a recess 52 in a body 54 forming a portion of the relay 34. The armature is insulated from the body by means of an insulation 56. The coil 58 is disposed in the housing 40 and surrounds the armature 46. A spring 60 normally urges the armature outwardly of the recess 52 and by magnetic action the coil 58 will urge the armature into the recess so that the contact plate 44 will bridge the contacts 40 and 42. The housing may be secured by screws or other fasteners as indicated at 62 to the firewall or other suitable portion of the motor vehicle with preferably the depressible portion 43 extending to the dashboard or being mounted thereon whereby the depressible portion 43 is readily accessible. The armature when actuated completes an operative electrical circuit through the coil 58 which is connected to the contact terminal 36 by means of a conductor 64 and which is further connected to ground as at 66. The depressible portion 43 may be formed out of any suitable material, preferably of insulative characteristics. Further, the body 54 of the relay may be grounded.

Also controlling the control circuit 18 are the door switches 70 of the automotive vehicle and if desired, a push button type switch 72 controlled by the parking brake may be utilized for various types of vehicles such as buses, limousines and the like so that when the parking brake is pulled tight, the switch 72 will open.

It is to be noted that the battery 28 is connected to ground as at 80.

In operation, with the automobile running and hence the ignition switch 30 closed, by pushing on the depressible portion 43, the contact plate 44 will be urged into a position so as to bridge the contacts 40 and 42. This will cause an operative electrical circuit to pass in the battery 28 through the ignition switch 30 and fuse 32, through the switch such as the switch 72 or other controlling switches and conductor 84 to the contact terminal 38 and contact 42 and thence through the contact plate 44 to the contact 40 whereby the circuit is completed through the conductor 64 and the coil 58 to ground as at 66. This will cause the armature 46 to maintain the contact plate 44 in contact with the contacts 40 and 42. The circuit will remain closed until one of the door switches 70 is closed by the opening of the door or the switch 72 is opened by the actuation of the parking brake. Obviously, in passenger cars or the like since the driver's seat door is usually not utilized, the door for the passenger seats may control the switches 70. When the switch 70 closes, the coil 58 is shorted so that the armature 46 and contact plate 44 are released. Further, as soon as the ignition switch 30 is opened, the circuit will be broken due to the fact that the relay coil 58 will no longer be excited and the spring 60 which overpowers the spring 48 will urge the contact plate 44 to a position where it does not bridge the contacts 40 and 42. An identical sequence will take place when switch 72 is opened.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A parking indicator signal system for an automobile comprising in combination with a source of electrical energy, a normally closed parking brake switch, a gapped pair of electrical contacts, a manually movable contact plate operable in advance of parking said automobile and adapted to electrically bridge said contacts, solenoid holding means for maintaining said bridged condition, a parking signal visibly carried by said automobile, a visual indicator lamp for lighting said signal, said source, brake switch, contacts, and lamp being electrically series connected to energize said lamp.

2. The combination of claim 1 wherein said series circuit further includes an ignition switch and fuse, a normally open door switch connected in parallel with said solenoid holding means for shorting any electrical energy therefrom to release said contact plate from said bridged condition.

References Cited in the file of this patent

UNITED STATES PATENTS

| | | |
|---|---|---|
| 1,184,090 | Frerks | May 23, 1916 |
| 1,650,471 | Servais | Nov. 22, 1927 |
| 2,119,450 | Trautner | May 31, 1938 |
| 2,298,068 | Pierce | Oct. 6, 1942 |
| 2,339,687 | Doane | Jan. 18, 1944 |
| 2,500,201 | Porter | Mar. 14, 1950 |
| 2,740,947 | Davies | Apr. 3, 1956 |
| 2,788,514 | Schmitt | Apr. 9, 1957 |